United States Patent Office 3,440,176
Patented Apr. 22, 1969

3,440,176
PREPARATION OF SILICA SOLS OF MINIMUM TURBIDITY
Roy J. Sippel, Deerhurst, Wilmington, Del., assignor to E. I. du Pont de Nemours and Company, Wilmington, Del., a corporation of Delaware
No Drawing. Filed Mar. 31, 1966, Ser. No. 538,967
Int. Cl. C01b 33/14; B01j 13/00
U.S. Cl. 252—313       7 Claims

ABSTRACT OF THE DISCLOSURE

The process for preparing stable silica aquasol having low turbidity and low occluded sodium which comprises feeding a dilute acid silica sol to a silica sol heel having a particle size of about 8 to 20 millimicrons in average diameter, maintain the pH of the heel between about 8.5 to 9.5 by feeding to the heel an aqueous sodium silicate solution and heating the mixture to evaporate the water at a rate sufficient to maintain a constant mixture volume.

This invention relates to a process for making concentrated silica sols having low occluded sodium and low turbidities. It is more particularly directed to an improvement in the procedure for increasing the particle size and silica concentration in a colloidal silica aquasol by (1) addition of dilute acid silica sol to a heel of silica particles which results in growth of the particles in the heel, followed by (2) evaporation of a portion of the water to provide a concentrated sol. The improvement comprises maintaining the system at a constant pH of about 9 by adding an alkali metal silicate while dilute acid silica sol is fed to the evaporator, with simultaneous removal of water.

U.S. Patent 2,574,902 to Bechtold and Snyder describes a process for making stable, concentrated silica sols having particles in the range of about 10 to 130 m$\mu$ which comprises "building-up" a heel of silica particles of less than 10 millimicrons average diameter by feeding to the heel a dilute acid silica sol with simultaneous heating and subsequent evaporation of a portion of the water. The feed sol used contained about 3 to 3.5% silica in particles of less than 10 millimicrons average diameter. It was obtained by cation-exchange treatment of a commercial sodium silicate solution according to the process described in U.S. Patent 2,244,325 to Bird. The heel was formed by heating an alkali-stabilized sol of the Bird type to a temperature of about 60° C. or higher which results in an increase in the molecular weight and particle size of the silica. The heating of the small silica particles of the feed sol in the heel effects a build-up of the smaller particles upon the larger.

U.S. Patent 2,929,790 describes a variation in this process whereby the $SiO_2:Na_2O$ ratio is controlled so that only sufficient sodium ions are present to stabilize the sol. This is accomplished by adding an acid sol of the Bird type to an alkaline heel sol in small increments with the simultaneous evaporation of water to maintain a constant volume of sol in the build-up vessel. This method is useful for producing sols having a $SiO_2$ content up to about 40%. A somewhat similar process is described in U.S. Patent 3,128,251 to Reven and Blake for preparing and stabilizing sols of up to about 52% concentration. In this method a sol having particles in the range of 13–50 millimicrons is added to a heel containing particles of similar size with simultaneous removal of water to maintain the volume of the system constant.

It has now been found that the build-up process wherein a dilute acid silica sol is fed to a heel of silica sol can be employed to produce stable sols having improved characteristics, viz, low occluded sodium and low turbidities, by maintaining the pH of the mixture, substantially constant throughout the addition at a value in the range of about 8.5 to 9.5 by simultaneously adding an alkali metal silicate solution. In a preferred embodiment, the process is carried out in a forced circulation evaporator, the volume of the sol in the evaporator being maintained constant by simultaneous addition of acid sol to the boiling liquid and removal of water, and the sodium silicate solution being introduced into the suction of a centrifugal pump in the recirculation line. For purposes of economy a natural circulation evaporator may be used during the build-up process provided that the silica concentration does not exceed about 40%. The final concentration step to 50% and higher should, however, take place in a forced circulation system. If a natural circulation evaporation is used, addition of the sodium silicate solution, used to maintain a constant pH, should be via a pump into the recirculation line of the evaporator.

In the practice of this invention the silica sol heel will ordinarily contain a silica concentration in the range of about 3 to 20% by weight, and preferably between about 8 and 11% by weight. The silica particles will ordinarily be substantially spherical and will have an average diameter in the range of about 8 to 20 millimicrons and preferably between about 10 and 15 millimicrons. The silica sol heel should normally have a pH in the range of about 9.0 to 10.0 and the $SiO_2:M_2O$ ratio preferably should be in the range of about 80:1 to 100:1, where M represents an alkali metal ion, but the range can be as broad as 50:1 to 250:1.

Suitable heel sols can be prepared by the method of the Bechtold and Snyder patent referred to above. A preferred method, however, is that described in Iler and Wolter U.S. Patent 2,631,134 and the variation thereof described in Dirnberger and Nelson U.S. Patent 2,974,109. As described in these patents, the method involves the in situ formation of stable silica sols by neutralization of an aqueous sodium or other alkali metal silicate solution with a cation-exchange resin in the hydrogen form while maintaining a pH above 8.0. Sols can be produced by this latter method ranging in particle size from 10 millimicrons or below up to about 130 millimicrons average diameter.

The preferred sols for use in this invention are those having particles in the range of about 10 to 15 millimicrons average diameter. If a sol having an original pH below about 9 is used the sol should preferably be adjusted to a pH of 9 to 10 by addition of sodium silicate prior to commencement of the build-up process.

A particularly preferred silica sol for use as the heel contains particles of about 12–13 millimicrons in a concentration of about 11% with a $SiO_2:Na_2O$ ratio of about 90 and a pH at 100° C. of about 9.4. If desired, the pH of the sol can be raised to a value of about 10 prior to beginning the addition of the dilute acid silica sol.

The dilute acid silica sol used in this invention is prepared by the method first described in Bird U.S. Patent 2,244,325. In this method a dilute solution of alkali metal silicate, e.g. sodium silicate, is converted to an acidic silica sol by contacting the solution with a cation exchange resin in the hydrogen form. The sols preferably have a silica concentration in the range of about 2 to 6%, more preferably 3–4%, by weight. The pH of the sols will range from about 2 to 4 at 25° C.

The alkali metal silicate solution used to produce the dilute acid sols and the heel sols may have a mol ratio of $SiO_2:M_2O$ from 1:1 up to about 3.9:1. Any soluble alkali metal silicate can be used. Sodium silicate will ordinarily be used since it is the cheapest of the soluble silicates, but it will be understood that potassium and lithium silicates can also be used.

The alkali metal silicate solution used to maintain the pH of the system constant during addition of the acid sol to the alkaline heel will also have a $SiO_2:M_2O$ mol ration between about 1 and 3.9. Here again it is understood that any alkali metal silicate or alkali metal hydroxide, or ammonia, or amine etc. can be used but sodium silicate is preferred. The concentration of the sodium silicate solution is not critical. Ordinarily a solution having a concentration in the range of about 5–15% will be used. If desired, the solution can be filtered prior to introduction into the system.

The temperature of the heel should be raised to at least about 60° C. prior to introduction of the dilute acid silica sol and this temperature should be maintained throughout the build-up process. In the preferred embodiment the process is carried out at the boiling temperature of the heel sol and water is removed continuously in order to maintain the volume of the mixture substantially constant.

The addition of dilute acid silica sol should be continued until the silica particles in the heel have increased to a size in the range of about 20 to 30 millimicrons average diameter. The total quantity of acid sol to be added is determined by the concentration of silica in the acid sol, the original particle diameter of the silica in the heel and the concentration of silica in the heel. The theoretical quantity can be calculated from the following equation:

$$\text{Wt. acid sol}=\frac{[(D_2/D_1)^3-1]A}{B}$$

where:

$D_2$ = final particle diameter, millimicrons
$D_1$ = initial particle diameter, millimicrons
$A$ = wt. silica in heel, lbs.
$B$ = wt. fraction silica in acid sol.

Experience has shown however that the particles produced in the process of this invention are slightly larger than would be predicted from the above equation. As noted above, one of the important advantages in the process of this invention is that the resulting sols exhibit unusually low turbidities. The particle size of the final product is an important factor in determining the turbidity of the material. Thus care should be taken to assure that the particles do not exceed about 30 millimicrons average diameter in the final product in order to obtain the benefits of the invention.

When the build-up process is completed, the product will ordinarily have a concentration of $SiO_2$ in the range of about 30 to 40% by weight. The product can if desired then be concentrated by evaporation of water to a concentration of up to about 53%. This can be done by straight boil-down, constant volume evaporation, or continuous evaporation. In all cases suppressed boiling in a forced circulation system is preferred to avoid fouling of the heat transfer surface by deposition of solids. Although it is apparent from the discussion that sols having a wide range of concentrations can be prepared, it is in making concentrated sols, e.g., in the range of about 48 to 50% $SiO_2$, that the benficial effects of the invention, especially lower turbidity, are most significant.

Turbidity of silica soles is determined as follows:

The light transmitted by the sol is measured on the linear scale of a Fisher Electrophotometer AC model using a B–525 green filter and a 23 ml. cylindrical cell as compared to the light transmission of distilled water in the same cell or a matched cell using the same filter.

The invention will be further described by the following illustrative examples:

EXAMPLE 1

A heel consisting of a 4756 gram portion of an 11% sodium-stabilized colloidal silica sol having particles with an average diameter of 15 m$\mu$ is placed in a laboratory-sized forced-circulation evaporator which is equipped with high temperature pH electrodes. The original heel material has a pH of 9.4 at 100° C. and a $SiO_2:Na_2O$ ratio of 90.

The sol is heated to boiling by introducing steam into the shell side of a shell and tube heat exchanger located in the recirculation line. When evaporation has begun a 3% acid silica sol having a pH of approximately 2.75 at 25° C. is added to the evaporator at a rate which maintains the evaporator volume constant, the evaporated water being removed from the system and condensed in a conventional glass laboratory condenser. The acid sol is fed through a rotameter directly to the boiling liquid in the evaporator.

As the acid sol is fed to the system the pH decreases to 9, then a 28.4% sodium silicate solution containing 8.7% $Na_2O$ is fed to the suction of a small centrifugal pump located ahead of the heat exchanger in the recirculation line in sufficient amount to maintain the pH constant at 9.

A total of 35,335 grams of the dilute acid sol containing 1130 grams of $SiO_2$ are added to the system increasing the size of the particles from about 15 millimicrons average diameter to about 22 millimicrons, and increasing the silica concentration to 30.8%.

All additions are then stopped and the sol is concentrated to 48% silica by direct evaporation of water. The sol is then cooled and filtered.

The product has a turbidity of 24.75 as measured on a Fisher Electrophotometer using a B–525 light filter.

EXAMPLE 2

A heel of 15,300 lbs. of a sodium-stabilized colloidal silica sol having particles with an average diameter of 12.6 millimicrons and a $SiO_2$ concentration of 8.1% is placed in a natural circulation evaporator. The heel material has a pH of 9.9 and a $SiO_2:Na_2O$ ratio of 93.

The heel is heated to boiling by introduction of steam into the shell of the evaporator calandria. As evaporation commences, feeding of an acid silica sol to the evaporator is started at a controlled rate to maintain the evaporator contents at a constant volume. The acid sol has a $SiO_2$ concentration of 3.18%, and it is introduced into the evaporator in the liquid recirculation line.

As the pH of the systems decreases to 9.3, controlled addition of a sodium silicate solution to the evaporator sol is started to maintain the pH of the sol at a value of about 9. The sodium silicate solution, containing 2.15% $Na_2O$, is added to the evaporator sol in the liquid recirculation line upstream of the acid sol feed port. A total of 163,000 lbs. of the dilute acid sol, containing 5200 lbs. $SiO_2$, is added to the evaporator during a period of about 12 hours. In addition 59 lbs. of $SiO_2$ are added with the dilute sodium silicate solution required to control the pH of the evaporator sol. The $SiO_2$ concentration of the sol at the end of the particle growth period is 35.3%.

The sol is then concentrated in a continuous forced circulation evaporator to a $SiO_2$ content of 51.0%. The cooled and filtered product has an average particle diameter of 25.3 millimicrons, a $SiO_2:Na_2O$ ratio of 229, a pH of 8.9, a turbidity of 40, and an occluded sodium content of 0.036%.

I claim:

1. A method of preparing a stable silica aquasol having a $SiO_2$ content of at least about 48%, a low turbidity and low occluded sodium which comprises steps (a)–(d) below, steps (b), (c) and (d) being performed simultaneously:
    (a) Providing a heel of silica sol having the following characteristics:
        (1) $SiO_2$ content in the range of about 3 to 20% by weight,
        (2) $SiO_2:Na_2O$ ratio in the range of about 50:1 to 250:1, (3) pH in the range of about 8 to 10,
(4) particle size in the range of about 8 to 20 millimicrons average diameter, said sol being prepared by ion exchange resin treatment of sodium silicate from contact with only cation exchange resins;

(b) Feeding into said heel a dilute acid silica sol, the addition being continued for a period of time sufficient to produce silica particles in the mixture having an average diameter in the range of about 20 to 30 millimicrons, said dilute acid silica sol having been prepared by contacting an alkali metal silicate solution with only cation exchange resins in the hydrogen form and having the following characteristics:

(1) $SiO_2$ content in the range of about 2 to 6% by weight,
(2) pH in the range of about 2 to 4, the weight of said acid sol being determined by the equation $$\text{Wt. acid sol} = \frac{[(D_2/D_1)^3 - 1]A}{B}$$

where:

$D_2$ = final particle diameter,
$D_1$ = initial particle diameter,
A = wt. silica in heel,
B = wt. fraction silica in acid sol;

(c) Feeding into said heel an aqueous sodium silicate solution as the heel is being recirculated to promote agitation, the rate of addition being sufficient to maintain the pH of the mixture substantially constant throughout the process at a value in the range of about 8.5 to 9.5;

(d) Heating the mixture to a temperature sufficient to evaporate the water, and removing the water at a rate sufficient to maintain the volume of the mixture substantially constant.

2. The process of claim 1 wherein the heel sol has a silica content in the range of about 8 to 11% by weight, a $SiO_2$:$Na_2O$ ratio in the range of about 80:1 to 100:1, a pH in the range of about 9 to 10, and a particle size in the range of about 10 to 15 millimicrons average diameter.

3. The process of claim 2 followed by the step of evaporating water from the mixture to produce a sol having a silica content up to about 53% by weight.

4. The process of claim 2 wherein the aqueous sodium silicate solution used in step (c) has the following characteristics:

(1) $SiO_2$:$Na_2O$ ratio in the range of about 1:1 to 3.9:1;
(2) Solids concentration between about 2% and 29% by weight.

5. The process of claim 2 wherein the aqueous sodium silicate solution used in step (c) has the following characteristics:

(1) $SiO_2$:$Na_2O$ ratio in the range of about 1:1 to 3.9:1;
(2) Solids concentration between about 5% and 15% by weight.

6. A process as defined in claim 1 wherein the heel is contained in a forced circulation evaporator, the dilute acid silica sol is introduced directly to the bulk boiling liquid and sodium silicate solution is introduced into the recirculation line of the evaporator.

7. A process as defined in claim 1 wherein the particle growth of the silica sol is accomplished by constant volume evaporation in a natural circulation evaporator and final concentration is accomplished in a forced circulation evaporator.

References Cited

UNITED STATES PATENTS

| | | | |
|---|---|---|---|
| 2,577,484 | 12/1951 | Rule | 252—313 |
| 2,974,109 | 3/1961 | Dirnberger et al. | 252—313 |
| 3,029,151 | 4/1962 | Reuter et al. | 252—313 X |

RICHARD D. LOVERING, *Primary Examiner.*